Oct. 6, 1970 D. KENNEDY 3,532,993
VARIABLE PERIOD, PLURAL INPUT, SET-RESET ONE SHOT CIRCUIT
Filed April 18, 1968
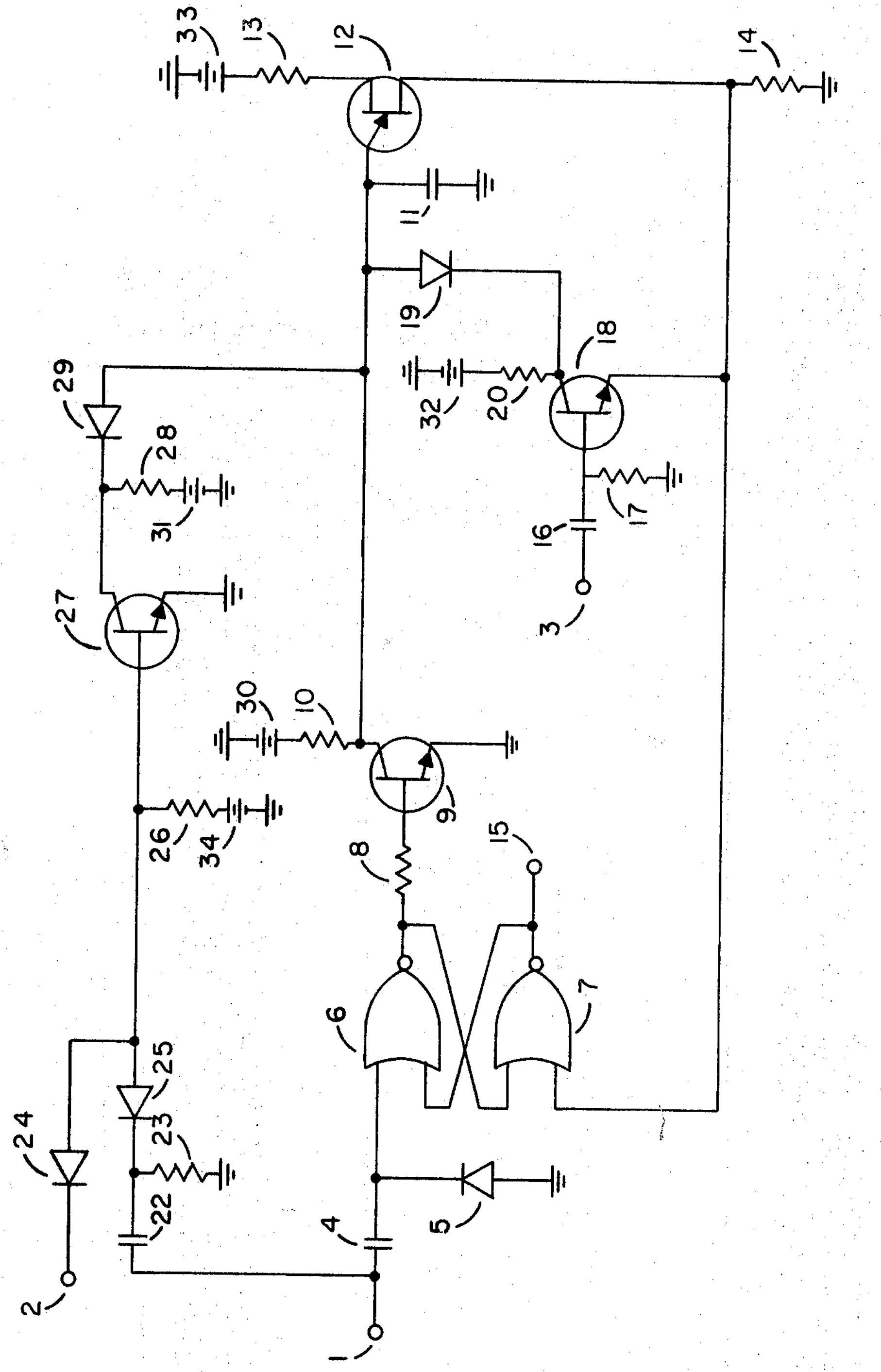

United States Patent Office 3,532,993
Patented Oct. 6, 1970

3,532,993

VARIABLE PERIOD, PLURAL INPUT, SET-RESET ONE SHOT CIRCUIT

Donald Kennedy, South Toms River, N.J., assignor to Electronic Associates Inc., Long Branch, N.J., a corporation of New Jersey Filed Apr. 18, 1968, Ser. No. 722,356
Int. Cl. H03k 5/04, 1/18
U.S. Cl. 328—58 5 Claims

ABSTRACT OF THE DISCLOSURE

A one-shot circuit having time cycle control enabling the circuit to time for either a first predetermined period, a time period based on time of receipt of the last control signal or at variable times initiated by receipt of a second control signal.

This invention relates to a variable period one-shot. More particularly, a controllable one-shot whose time of firing can be varied by several different input signal combinations.

Many electronic applications require accurate and variable timing control of certain components based on the timing sequence of other functions in the device. For example, in the control of a digital voltmeter as a readout device, there are situations where either the voltmeter must be held for a long period of time on one reading or must be switched to accept a new input at frequent intervals.

The present circuit provides a simple and inexpensive timing control for such a situation as by having several control inputs which, when properly energized serve to vary the ON time of a flip-flop thereby providing a variable timing control output.

It is an object of the invention to provide a variable period one-shot circuit.

A further object is the provision of a one-shot circuit having means to permit timing from the time of receipt of the last control input.

Another object is the provision of a one-shot whose timing cycle is variable based on the time of receipt of a second control.

These and other objects of the invention will become apparent from a reading of the following specification which refers to the accompanying drawing in which:

The single figure is a schematic diagram of the principal embodiment of the invention.

In brief, the firing time of a unijunction transistor is controlled by the voltage magnitude stored on a capacitor. The output of the unijunction or the output of the capacitor is utilized to reset a DC coupled flip-flop circuit comprised of two NOR gates. The circuit has the control sources for the charging of the capacitor. The first control enables timing for a fixed time initiated by receipt of an input signal at the circuit input terminal. The second control ensures timing receipt of an input signal by momentarily discharging the capacitor to ground before charging of the capacitor commences. The third control discharges the capacitor to a reset input of the DC coupled flip-flop at times determined by receipt of a second control signal at another input terminal. A high duty cycle is obtained because of the provision of a very low impedance discharge path for the capacitor. A first discharge, path consists of the internal emitter-base resistance of the unijunction transistor and a very small resistor. The second discharge path consists of the series combination of the internal forward resistance of a diode and the internal collector-base-emitter resistance of a conducting switching transistor.

In the single figure, numeral 1 denotes an input terminal which receives a positive pulse of predetermined duration from a pulse source, not shown. Terminal 1 is connected to NOR gate 6 via capacitor 4 and diode 5. Capacitor 4 serves to block DC flow and to differentiate the leading edge of the pulse to NOR gate 6. Diode 5 has its anode coupled to ground and its cathode coupled to capacitor 4 and the input of NOR gate 6. This diode ensures that only a positive signal appears at NOR gate 6 by shunting any negative going portions of the NOR gate input signal to ground.

A NOR gate is a logical element which performs algebraically in the following manner: $A+B=f(\overline{A}\cdot\overline{B})$ where A indicates the expression "not A."

NOR gates 6 and 7 are connected in the standard manner so as to constitute a DC coupled "flip-flop" circuit. The output of NOR gate 6 is connected as an input to NOR gate 7 and to the base of normally conducting switching transistor 9 via bias resistor 8.

Transistor 9 is connected in the grounded emitter configuration. The collector of this transistor is coupled to a source of positive potential, 30, via collector load resistor 10 which resistor also functions as a part of the timing control in a capacitor charging circuit to be described below.

The collector of transistor 9 is connected to the emitter of unijunction transistor 12. One base of unijunction transistor 12 is connected to the source of positive potential 33, via bias resistor 13. The other base of unijunction 12 is connected to ground via very low valued resistor 14, and to the other input of NOR gate 7.

The above described portion of the circuit operates as follows: a positive signal is applied to the base of transistor 9 to render that transistor normally conductive. In order for such a positive signal to be applied to transistor 9, the output of NOR gate 6 must be positive. A NOR gate produces a positive output only when both its inputs are low (for example, zero). Thus, the inputs to NOR gate 6 must both be low so that transistor 9 is biased to conductivity. Since the inputs to NOR gate 6 are both low, the output of NOR gate 7 at system output terminal 15 must be low. The output of NOR gate 15 is low when the inputs thereto are not both low. As the input of NOR gate 7 connected to the output of NOR gate 6 is positive, the other input to NOR gate 7 may be either positive or low. In practice, the other input to NOR gate 7 is low. Thus, initially, both inputs to NOR gate 6 are low while the inputs to NOR gate 7 are positive and low.

A positive pulse is then applied to input terminal 1. This pulse is converted to a positive spike by capacitor 4 and diode 5 causing one input of NOR gate 6 to go positive causing the output signal of this gate to become zero.

With the output of NOR gate 6 at zero, both inputs to NOR gate 7 are now zero causing the signal at output terminal 15 to go positive for a time period controlled by the timing circuit described below. The zero output at the base of transistor 9 turns that transistor OFF. With transistor 9 OFF a charging circuit for capacitor 11 may be traced from positive voltage source 30, through resistor 10 to capacitor 11. This capacitor charges to a magnitude limited by the breakdown voltage of unijunction transistor 12 and at a rate determined by the values of resistor 10 and capacitor 11. When unijunction transistor 12 turns ON, capacitor 11 discharges through a low impedance path comprised of internal emitter base resistance in unijunction 12 and very low resistance 14 and the positive signal thus generated is fed to one input of NOR gate 7. This positive input changes the output at terminal 15 from positive back to zero. As, at this time, the positive spike developed by capacitor 4 and diode 5 from the signal input at terminal 1 has terminated. The signal output at terminal 15 appears at the other input to NOR gate 6; thus, both inputs are at zero and a high or positive output is again developed by gate 6, turning transistor 9 ON.

Two additional sources of control are available in the present invention.

The first control source permits the timing of the one-shot to be controlled by the time between input control pulses. Such control is developed by simultaneously applying the same input signal to terminals 1 and 2.

Terminal 1 is connected to a differentiating circuit consisting of capacitor 22 and resistor 23. The output of this differentiating circuit is connected to the cathode of diode 25 which functions, in combination with diode 24, as a logical AND gate. Thus, when both inputs to the AND gate are positive, a positive output pulse of short duration is applied to the base of normally non-conducting switching transistor 27 turning that transistor ON. With transistor 27 ON, a discharge path for capacitor 11 may be traced from that capacitor, diode 29, and the collector, base and emitter of transistor 27 to ground. Diode 29 prevents voltage source 31 from charging capacitor 11 through resistor 28 during the non-conducting or OFF state of transistor 27. Resistor 26 and positive voltage source 34 provide base bias for transistor 27.

Thus, capacitor 11 is discharged at the beginning of each new input pulse. This ensures that the timing cycle for the one-shot will begin upon receipt of this new input pulse.

A further control for the timing cycle of the one-shot is provided at input terminal 3. This terminal permits further variation of the timing of the one-shot as desired. A positive pulse is applied to terminal 3 and is differentiated by a network consisting of capacitor 16 and resistor 17. This differentiated signal turns transistor 18 ON for a brief interval which discharging capacitor 11 through diode 19, the collector base and emitter of transistor 18 to a control input of NOR gate 7. A positive pulse is thus applied from capacitor 11 to NOR gate 7 which pulse recycles the flip-flop as described above. Diode 19 prevents voltage source 32 from charging capacitor 11 through resistor 20 during the non-conducting or OFF state of transistor 18.

Now that the principal embodiment of the invention has been described, it will be apparent that modifications may be made thereto without departing from the spirit and scope thereof. For example, PNP transistors may be utilized in place of the NPN transistors with corresponding changes in polarity of voltage supply sources. Therefore, the scope of the invention is to be defined by the appended claims.

I claim:

1. A variable period one-shot comprising: first, second, and third input terminals, bistable circuit means having two input means and two output means, said first input terminal being connected to one of said input means, timing means having an input and an output, said output being connected to the other said input means, first control means for said timing means having a first input connected to said first input terminal and a second input connected to said second input terminal and an output connected to said timing means input, second control means for said timing means having an input coupled to one of said output means and an output coupled to said timing means input, and third control means for said timing means having its input connected to said third input terminal and its output connected to said timing means input and to the other of said input means.

2. The variable period one-shot of claim 1, wherein said timing circuit includes a capacitor, and low impedance means connected to discharge said capacitor thereby producing an input signal for said other input means.

3. The variable period one-shot of claim 2 wherein said first control means includes a logical AND gate having a first input coupled to said first input terminal, a second input connected to said second input terminal and an output, and switching means controlled by said AND gate output and connected to said timing means to ensure discharge of said capacitor and, thereby, precise timing of said timing means.

4. The variable period one-shot of claim 3 wherein said second control means includes switching means controlled by the output at said one output means and connected to said capacitor to control the charging of said capacitor and, thereby, the timing of said bistable means.

5. The variable period one-shot of claim 4 wherein said third control means includes switching means controlled by a signal at said third input terminal and coupled between said capacitor and said other input means to discharge said capacitor thereby changing the state of said bistable means.

References Cited

UNITED STATES PATENTS

| | | | |
|---|---|---|---|
| 3,085,165 | 4/1963 | Schaffert et al. | 307—273 |
| 3,187,201 | 6/1965 | Eastman et al. | 307—273 X |
| 3,396,282 | 8/1968 | Sheng et al. | 307—273 X |
| 3,465,174 | 9/1969 | Soltz | 307—265 X |

DONALD D. FORRER, Primary Examiner

S. D. MILLER, Assistant Examiner

U.S. Cl. X.R.

307—265, 273, 283, 293; 328—207